R. HOFFMAN.
OIL STOVE.
APPLICATION FILED AUG. 8, 1913.
1,092,261.  Patented Apr. 7, 1914.
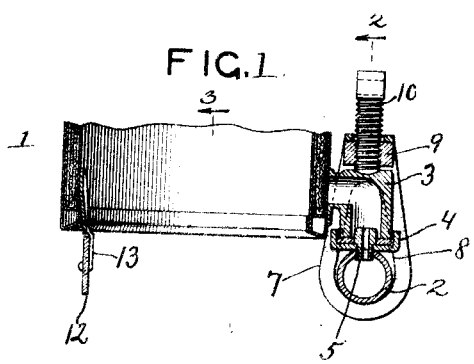
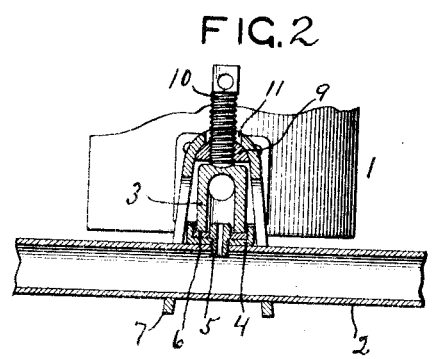
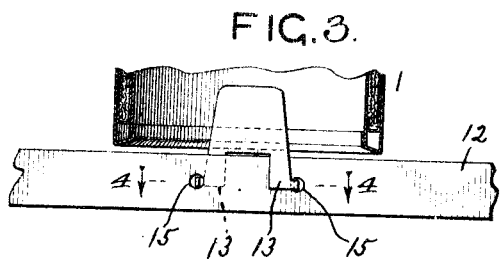
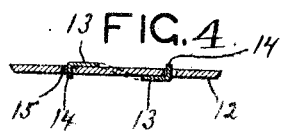
Witnesses:
Inventor.
Rudolph Hoffman.

UNITED STATES PATENT OFFICE.

RUDOLPH HOFFMAN, OF CHICAGO, ILLINOIS, ASSIGNOR TO SEARS, ROEBUCK AND COMPANY, OF CHICAGO, ILLINOIS, A CORPORATION OF NEW YORK.

OIL-STOVE.

1,092,261.   Specification of Letters Patent.   Patented Apr. 7, 1914.

Application filed August 8, 1913. Serial No. 783,842.

*To all whom it may concern:*

Be it known that I, RUDOLPH HOFFMAN, a citizen of the United States, residing at Chicago, in the county of Cook and State of Illinois, have invented certain new and useful Improvements in Oil-Stoves, of which the following is a specification.

This invention relates to an improved means for detachably securing a burner in place in an oil stove.

In the accompanying drawings, Figure 1 is a vertical central sectional view illustrating one embodiment of my invention. Fig. 2 is a view taken in the plane of dotted line 2 of Fig. 1. Fig. 3 is a view taken in the plane of dotted line 3 of Fig. 1. Fig. 4 is a section on line 4 4 of Fig. 3.

In the embodiment herein shown of the invention, 1 denotes the body of the oil burner, said body consisting of an inner and an outer wick tube connected together at their lower ends to form a tubular receptacle for the wick and a small quantity of oil. Said receptacle is connected to a feed pipe 2 leading from a suitable reservoir (not shown) by the means to be now described.

3 is an angular inlet connection rigidly secured to the outer wick tube and adapted at its outer lower end to rest upon a shallow cup 4 secured to the pipe 2 by means of a tubular nipple 5. Preferably a packing ring or gasket 6 is interposed between the cup 4 and the inlet connection 3. Said inlet connection is clamped against the packing ring by means of a rigid yoke 7 having openings 8 therein for the reception of the pipe 2. Said yoke passes over the top of the inlet connection 3 and rests upon a nut 9 through which extends a clamping screw 10, said screw also passing through an opening 11 in the yoke and bearing against the top of the inlet connection. It will be seen that when the clamping screw 10 is tightened, the inlet connection 3 will be rigidly secured to the pipe 2. The upper side of the nut 9 is rounded, and the yoke 7 is correspondingly shaped so that the yoke may bear equally upon the pipe 2 at opposite sides of the cup 4. The opening 11 is elongated, as shown in Fig. 2, so that the screw 10 shall be free to bear squarely upon the inlet connection. The openings 8 in the yoke are sufficiently large to allow for slight variations in the size of the pipe 2 with which the yoke is to be used. The opposite side of the body 1 is detachably secured to a suitable supporting member, such as a frame bar 12 by means of two arms 13 fixed, in this instance, to the inner side of the inner wick tube, said arms lying at opposite sides of the frame bar 12 and each arm having an angular lug 14 extending into an opening 15 in the frame bar. It will be seen that after the screw 10 has been slackened, and the yoke 7 turned on the axis of the pipe 2 until said yoke is clear of the inlet connection 3, the body 1 may be turned sufficiently to disengage the lugs 14 from the openings 15, whereupon the body may be lifted off the frame bar 12 and the feed pipe 2. The feed pipe 2 and the frame bar 12 may extend substantially parallel with each other, as herein shown. Said pipe and frame bar extend at the sides of the burner instead of across the lower end thereof, as in prior devices, and thus do not obstruct the free flow of air upwardly through the inner wick tube.

I would have it understood that the invention is not limited to the precise details described except to the extent indicated in the appended claims.

I claim as my invention:

1. The combination of a burner body; an inlet connection secured to said body; a feed pipe; means on said feed pipe arranged to be engaged by said inlet connection; a yoke having openings through its arms, said pipe extending through said openings; a nut within said yoke; and a clamping screw extending through said yoke and said nut and bearing against said inlet connection.

2. The combination of a burner body; an inlet connection secured to said body; a feed pipe; a cup on said feed pipe arranged to receive one end of said inlet connection; a nipple securing said cup to said pipe; a yoke having openings through its arms, said pipe extending through said openings, said yoke passing over the top of said inlet connection; a nut within said yoke and a clamping screw extending through said yoke and said nut and bearing against the top of said inlet connection.

3. The combination of a burner; a frame bar; two arms extending downwardly from one side of said burner and lying at opposite sides of said frame bar; one of said arms having an angular portion arranged to engage said frame bar; a feed pipe; and means for securing the opposite side of the burner to said feed pipe.

4. The combination of a burner body; an inlet connection secured to said body; a feed pipe; means on said feed pipe arranged to be engaged by said inlet connection; a yoke having openings through its arms, said pipe extending through said openings; a nut within said yoke and having a rounded side in contact with the yoke, the latter having an opening opposite said nut, said last mentioned opening being elongated in the direction of extension of the pipe; and a clamping screw extending through said elongated opening and said nut and bearing against said inlet connection.

In testimony whereof I affix my signature in presence of two witnesses.

RUDOLPH HOFFMAN.

Witnesses:
M. H. MANN,
GEORGE L. CHINDAIIL.